United States Patent [19]
Kusaka

[11] Patent Number: 5,430,287
[45] Date of Patent: Jul. 4, 1995

[54] AUTOFOCUS ADJUSTMENT APPARATUS AND INTERCHANGEABLE LENS DEVICE FOR AN AUTOFOCUS ADJUSTMENT APPARATUS HAVING A DEFOCUS AMOUNT CALCULATION UNIT

[75] Inventor: Yosuke Kusaka, Yokohama, Japan

[73] Assignee: Nikon Corporation, Tokyo, Japan

[21] Appl. No.: 166,973

[22] Filed: Dec. 15, 1993

[30] Foreign Application Priority Data

Dec. 15, 1992 [JP] Japan .................................. 4-334742

[51] Int. Cl.$^6$ .................................................. G01J 1/20
[52] U.S. Cl. ................................... 250/201.5; 354/402
[58] Field of Search ............... 250/201.5, 201.2, 201.8; 354/402, 406, 407, 408, 403

[56] References Cited

U.S. PATENT DOCUMENTS

| | | |
|---|---|---|
| 4,536,072 | 8/1985 | Tamiguchi et al. .................. 354/403 |
| 4,837,594 | 6/1989 | Nakamura et al. .................. 354/402 |
| 4,931,820 | 6/1990 | Matsuzawa et al. ................. 354/402 |
| 5,036,348 | 7/1991 | Kusaka ................................ 354/402 |
| 5,243,375 | 9/1993 | Ishida et al. ....................... 250/201.2 |

FOREIGN PATENT DOCUMENTS 62-170924  7/2887  Japan .

*Primary Examiner*—David C. Nelms

[57] ABSTRACT

An autofocus adjustment apparatus for use on a camera and an interchangeable lens device, such as a lens barrel, for an autofocus adjustment apparatus, having increased responsiveness and lens drive accuracy and which can correspond to various photographic optical systems. A small drive amount is calculated for every small defocus amount and an optical lens is driven in relation to this small drive amount.

19 Claims, 11 Drawing Sheets

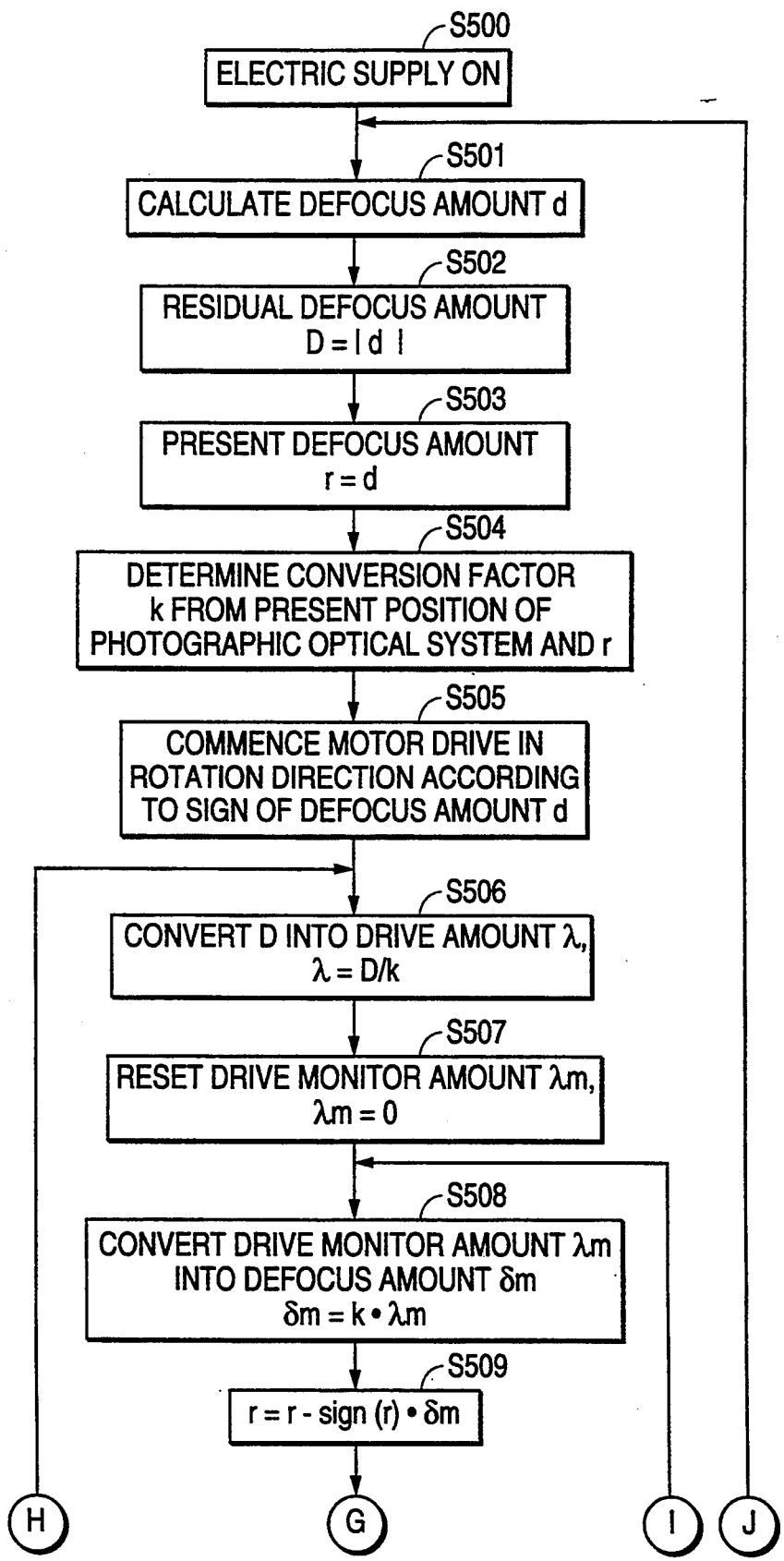

FIG. 14(a)
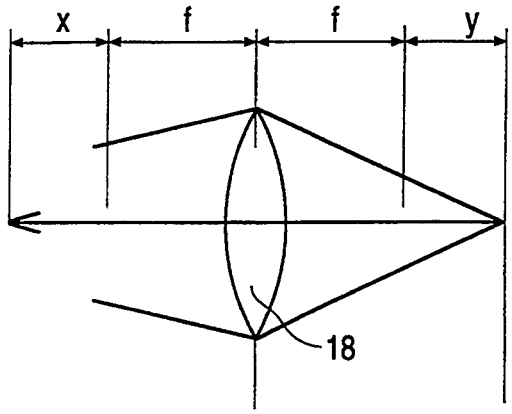
FIG. 14(b)
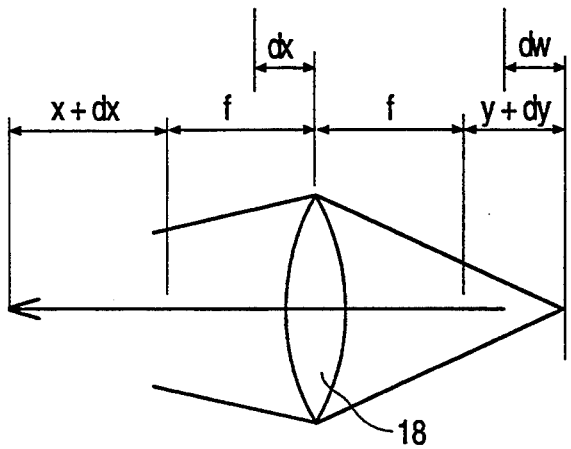
FIG. 15
| LENS POSITION FROM IMAGE PLANE | ADDRESS | CONVERSION FACTOR |
|---|---|---|
| L0 | A0 | k0 |
| L1 | A1 | k1 |
| L2 | A2 | k2 |
| L3 | A3 | k3 |
| ⋮ | ⋮ | ⋮ |
| Ln | An | kn |

AUTOFOCUS ADJUSTMENT APPARATUS AND INTERCHANGEABLE LENS DEVICE FOR AN AUTOFOCUS ADJUSTMENT APPARATUS HAVING A DEFOCUS AMOUNT CALCULATION UNIT

BACKGROUND OF THE INVENTION

1. Field of the Invention

The present invention relates to an autofocus adjustment apparatus for a camera and to an autofocus adjustment apparatus having an interchangeable lens.

2. Description of the Related Art

Advanced cameras are available with autofocus adjustment devices which simplify operations for a camera user. These autofocus adjustment devices are provided with camera systems having a movable focusing lens as part of a "photographic optical system," wherein the focusing lens can be adjusted to provide optimal focus. Autofocus adjustment devices typically detect a defocus amount of a subject image plane with respect to a predetermined focal plane of the photographic optical system, convert this defocus quantity into a lens drive amount and move the focusing lens by this lens drive amount.

With these types of focus adjustment devices, a conversion factor for converting the defocus quantity into a lens drive amount is precalculated and stored for each lens position. When it is required to move the lens, the appropriate conversion factor is read from the stored location and used to drive the lens to an appropriate position.

In the case in which the defocus amount is a small quantity, the relationship between the defocus amount and the lens drive amount is generally linear and the defocus amount d is converted into the lens drive amount L using a predetermined conversion factor k according to the following equation (1):

$$L = d/k \qquad (1)$$

For example, FIG. 14(a) shows a single lens 18 having a focal length f. A subject is at a distance x from the front side focal length. The distance from the rear side focal length to the subject image plane is y. From Newton's formula, the relationship of f, x and y is given by the following equation (2):

$$y = f^2/x \qquad (2)$$

In the case in which lens 18 is moved to the image plane side by an amount dx, as shown in FIG. 14(b), the movement of the image position must be considered. Differentiating equation (2), the amount of differential image plane movement dy is found from equation (3):

$$dy = (-f^2/x^2) \cdot dx \qquad (3)$$

Because the actual amount of differential image plane movement dw is the difference between the image plane position of FIG. 14(a) and the image plane position of FIG. 14(b), dw can be represented by either of the following equations (4) or (5).

$$\begin{aligned} dw &= (dx + f + y + dy) - (f + y) \\ &= dx + dy = (1 - f^2/x^2) \cdot dx \end{aligned} \qquad (4)$$

$$dw = (1 - y^2/f^2) \cdot dx \qquad (5)$$

Equation (4) can be rewritten in the form of $dw = k \cdot dx$ where conversion factor k equals $(1 - f^2 x^2)$. Equation (5) can be written in the form $dw = k \cdot dx$ where conversion factor k equals $(1 - y^2/f^2)$.

In equation (4), under normal photographic conditions, it can be assumed that $x > f$ [in equation (5), it can be assumed that $f > y$]. Therefore, the term $f^2/x^2$ becomes very small and the image plane movement amount dw becomes equal to the lens movement amount dx. In short, in the case of a single lens under normal photographic conditions, the conversion factor k of equation (1) is set to 1. Event in lens systems other than single lens systems, the lens movement amount and the image plane movement amount are linearly related when the subject is at a remote distance.

However, when the subject is at a close distance, the term $f^2/x^2$ in equation (4) and the term $y^2/f^2$ in equation (5) cannot be neglected. In this case, it is necessary to modify the conversion factor k according to equation (4) or equation (5).

In effect, when the defocus amount d is small and the image plane is moved by the defocus amount, equation (1) applies and the lens drive amount L is linearly related to the defocus amount d using the conversion factor k. However, when the defocus amount d is large, equations (4) and (5) apply.

From the application of equations (4) and (5), a phenomenon occurs in which the conversion factor changes and the lens drive amount L is no longer linearly related to the defocus amount d. In order to solve this problem, as shown in an autofocus adjustment apparatus disclosed in JP-A-62-170924 (Japanese Laid-Open Patent Publication 62-170924), the lens drive amount L is found in relation to the defocus amount d by introducing higher order terms.

$$L = d/\{k0 \cdot (1 + c0 \cdot d)\} \qquad (6)$$

Here k0, c0 are predetermined constants. In an autofocus adjustment device with the lens drive amount L found by nonlinear conversion equation (6) above,; respective equations for the values of k0, c0 are established such that any error of the lens drive amount becomes small.

Focus adjustment systems, however, are typically only one part of a larger photographic optical system which includes various types of systems and subsystems. These systems and subsystems can include a whole group extension system, an inner focus system, a front lens extension system and a rear focus system. Therefore, it is difficult for one type of conversion equation (such as equation (6)) to cover all types of photographic optical systems. In some optical systems, even if the values of k0 and c0 are optimally established, the residual error becomes large and the focused state cannot be reached by driving the optical lens only one time. Therefore, it is usually required to drive the lens a number of times in order to properly focus a photographic optical system, thereby resulting in decreased responsiveness.

SUMMARY OF THE INVENTION

It is an object of the present invention to provide an autofocus adjustment device having increased responsiveness and lens drive accuracy and which can correspond to various photographic optical systems.

It is an advantage of the present invention to increase responsiveness by using a nonlinear relationship between a defocus amount and a lens drive amount as related by a changing conversion factor.

It is an additional advantage of the present invention to use the nonlinear relationship and the changing conversion factor to update the lens drive control in detail for every small defocus amount or small drive amount. In summary, lens drive errors are reduced by performing the lens drive control in small units such that the lens position can correspond to the changes of the conversion factor.

The present invention recognizes the advantages of this approach over prior approaches in which a conversion factor for every lens position is precalculated and stored before the commencement of the lens drive.

In addition, it is a feature of the present invention to provide an autofocus adjustment apparatus having an interchangeable lens device.

The above objects, features and advantages are achieved by providing an autofocus adjustment apparatus for a camera, comprising (1) a photographic optical system having an optical element movable in the optical axis direction in order to form a subject image on a predetermined focal plane, (2) driving means for driving the optical element in the optical axis direction by a drive amount, (3) focus detection means for detecting a defocus amount of an image plane of the photographic optical system with respect to the predetermined focal plane, said defocus amount capable of being broken down into at least one small defocus amount, (4) conversion factor output means for outputting a conversion factor for use in converting the defocus amount into a drive amount, (5) drive control means for reducing the defocus amount by controlling the drive amount of the driving means according to the defocus amount and the conversion factor, wherein a small drive amount related to each small defocus amount is calculated, and the drive control means drives the driving means in relation to the small drive amount.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIG. 12 is a flow chart showing the action of the lens drive control unit and the conversion factor output unit.

FIGS. 14(a) and (b) are diagrams showing the relationship between the lens position and the image plane position in the case of a single-lens.

FIG. 15 is a conversion table for finding the conversion factor.

DESCRIPTION OF THE PREFERRED EMBODIMENTS

Figure 1:
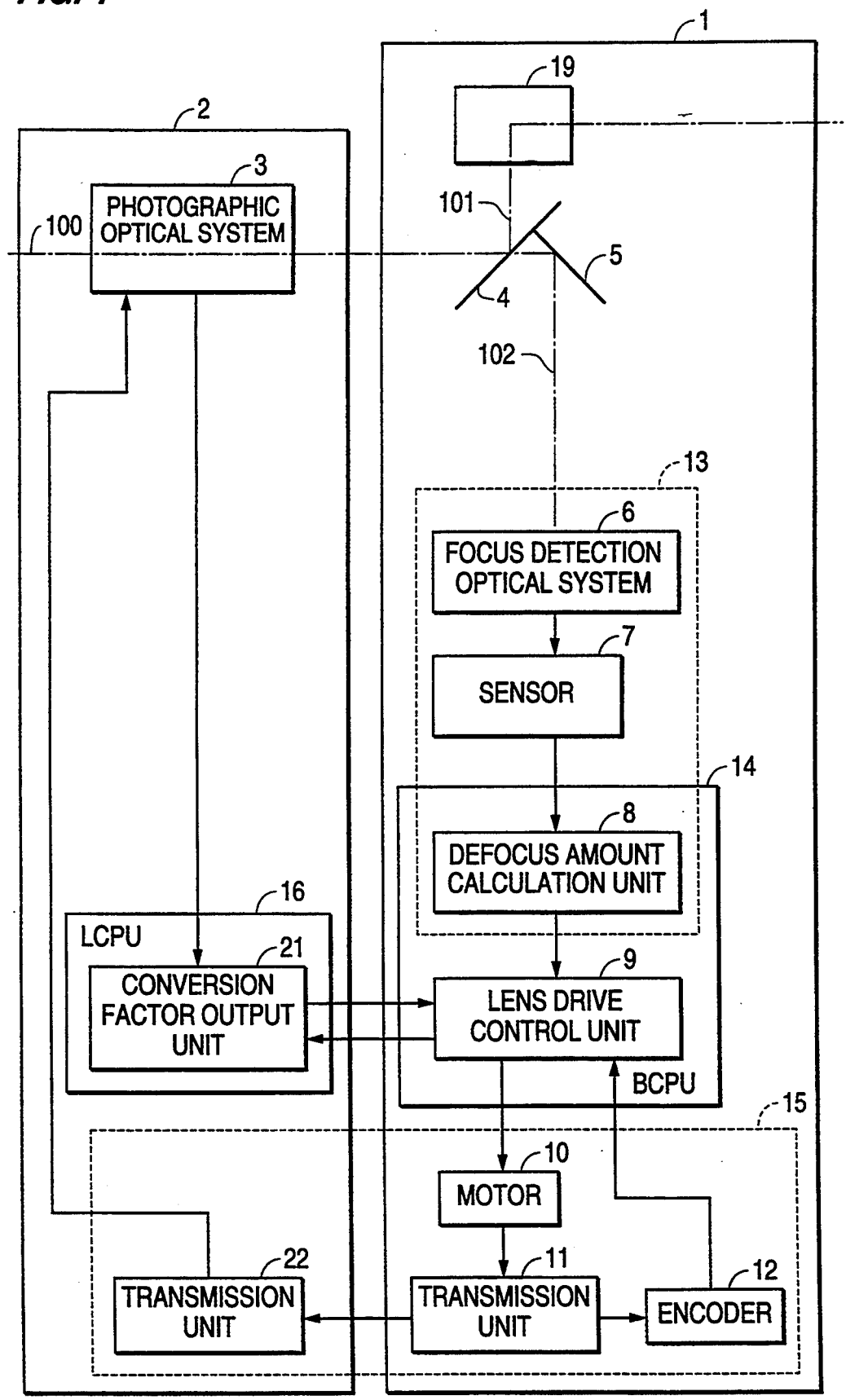
FIG. 1 is a block diagram showing a first embodiment of the invention.

With reference to the drawings, wherein like reference numerals represent similar structures throughout the several views, preferred embodiments of the invention will now be described. More particularly, in a first embodiment of an interchangeable lens camera system shown in FIG. 1, lens 2, such as a lens barrel device, is interchangeably attached and installed on body 1, such as a camera body. Within lens 2 is a photographic optical or lens system 3. A pencil 100 of light from a subject (not illustrated) is divided by main mirror 4 and a half-silvered sub-mirror 5 so that a portion 101 of the light pencil is directed to viewfinder 19. A portion 102 of the light pencil deflected downwards by sub-mirror 5 is directed towards the bottom of body 1 and passes to a focus detection optical system 6 located adjacent to a predetermined focal plane (not illustrated) of photographic optical system 3.

Focus detection optical system 6, sensor 7, and defocus amount calculation unit 8 constitute focus detection unit 13, wherein defocus amount calculation unit 8 detects a defocus amount d of the image plane of the photographic optical system 3 and the predetermined focal plane.

Lens drive control unit 9, e.g., as included in BCPU 14, sends the defocus amount d or a present defocus amount r (to be discussed later) to conversion factor output unit 21 preferably comprising microcomputer LCPU 16 provided with the lens 2.

Photographic optical system 3 includes an optical element (not illustrated) which is movable in order to adjust the focus. Conversion factor output unit 21 finds the conversion factor k based on the lens position of this optical element and on the defocus amount d and sends the conversion factor to lens drive control unit 9.

Moreover, as embodied herein, motor 10, transmission unit 11, transmission unit 22 and encoder 12 constitute a drive unit 15. Transmission unit 22 is located in lens 2, whereas motor 10, transmission 11 and encoder 12 are located in body 1.

Figure 2:
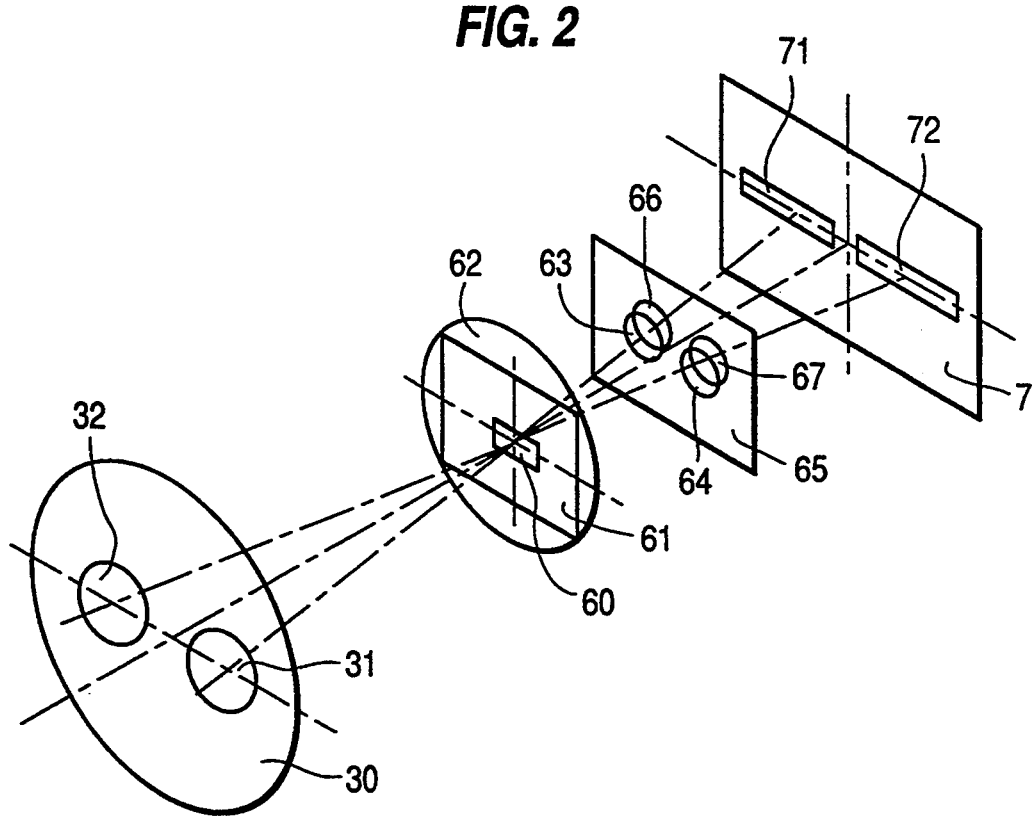
FIG. 2 is a diagram of a focus detection optical system and sensor.

FIG. 2 further illustrates focus detection optical system 6 and sensor 7 of FIG. 1. Focus detection optical system 6 comprises a mask 61 having an aperture 60, a condenser lens 62, a stop mask 65 having a pair of stop apertures 63 and 64, and a pair of re-imaging lenses 66 and 67. Sensor 7 comprises a pair of light receiving units 71 and 72. A primary image formed on an optical axis by photographic optical system 3 is reimaged as a pair of secondary images on light receiving units 71 and 72. Light receiving units 71 and 72 are respectively constituted by plural picture elements (not illustrated).

Stop apertures 63 and 64 are projected by condenser lens 62 on a pair of regions 31 and 32 which are symmetrical with respect to the optical axis of plane 30 in the neighborhood of an exit pupil (not illustrated) of photographic optical system 3. Through regions 31 and 32, light beams first form primary images in the vicinity of field mask 61. The primary image formed in aperture 60 of field mask 61, through condenser lens 62 and stop apertures 63 and 64, forms a pair of secondary images on the pair of light receiving units 71 and 72 of sensor 7 by means of the pair of re-imaging lenses 66 and 67.

The intensity distribution of the pair of secondary images is photoelectrically converted by light receiving units 71 and 72 to give electrical subject image signals. A pair of electrical subject image signals are introduced into microcomputer BCPU 14. Defocus amount calculation unit 8, by finding the mutual position relationship of the subject image signals, detects the defocus amount d of the image plane of the photographic optical system 3 and the predetermined focal plane.

Figure 3:
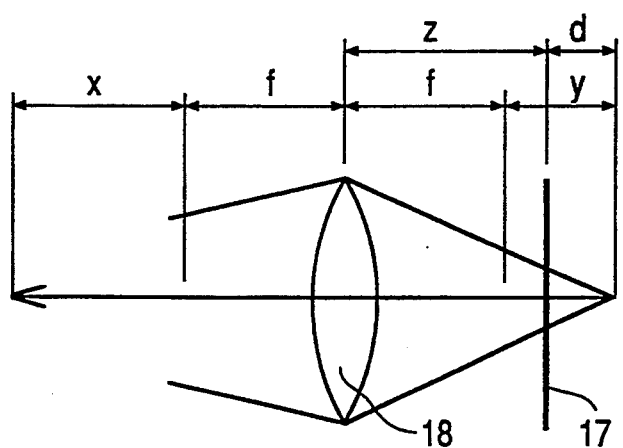
FIG. 3 is a diagram showing the relationship between the lens position and the defocus amount in the case of a single lens.

The determination of the conversion factor k is based on the lens or optical element position z and the defocus amount d. The conversion factor k will be described with reference to FIG. 3 which illustrates the lens position z and defocus amount d in the case of a single lens. The lens position is z for the position of lens 18 when based on a predetermined focal plane 17. The difference of the predetermined focal plane 17 and the image plane is the defocus amount d.

As shown in FIGS. 14(a) and 14(b), the distance from the rear side focal length to the image plane is y. In addition, $y=(z+d)-f$. The relationship between a small amount of image plane movement, dw, and a small amount of lens movement, dx, is found by substituting the above value of y into equation (5):

$$\begin{aligned} dw &= k \cdot dx \quad (7) \\ &= (1 - y^2/f^2) \cdot dx \\ &= \{(z + d) \cdot (2f - z - d)/f^2\} \cdot dx \end{aligned}$$

Namely, in the case of a single lens, if the lens position z and the defocus amount d are found, the relationship between the small image plane movement amount dw and the small lens movement amount dx is found from the above equation (7), wherein the conversion factor k is represented by $(z+d) \cdot (2f-z-d)/f^2$.

Also, in a lens system having other than a single lens, if the position z of the optical element which is moved for focus adjustment and the defocus amount d are known, the conversion factor can be found by calculation from the design values of the lens system.

The conversion factor output unit 21 is provided with the position z of the optical element and the defocus amount d as inputs. Conversion factor output unit 21 then computes the conversion factor k by either a calculation (such as by equation (7) above), or from a previously calculated predetermined conversion table, and sends the conversion factor to lens drive control unit 9.

FIG. 15 is an example wherein the conversion factor k is found from a previously calculated predetermined conversion table. The addresses (A0 ... An) where conversion factors (k0 ... kn) found by previous calculation are stored are given in correspondence with the distance (L0 ... Ln) between the image plane and the optical element. Conversion factor output unit 21, from the position z of the optical element and the defocus amount d, finds the distance L between the image plane and the optical element as z+d, and reads out from a table the conversion factor k stored at the address A corresponding to L. Conversion factor output unit 21 sends the conversion factor k to the lens drive control unit 9.

Lens drive control unit 9 receives the conversion factor from the conversion factor output unit 21 and performs drive control as described below.

Figure 4:
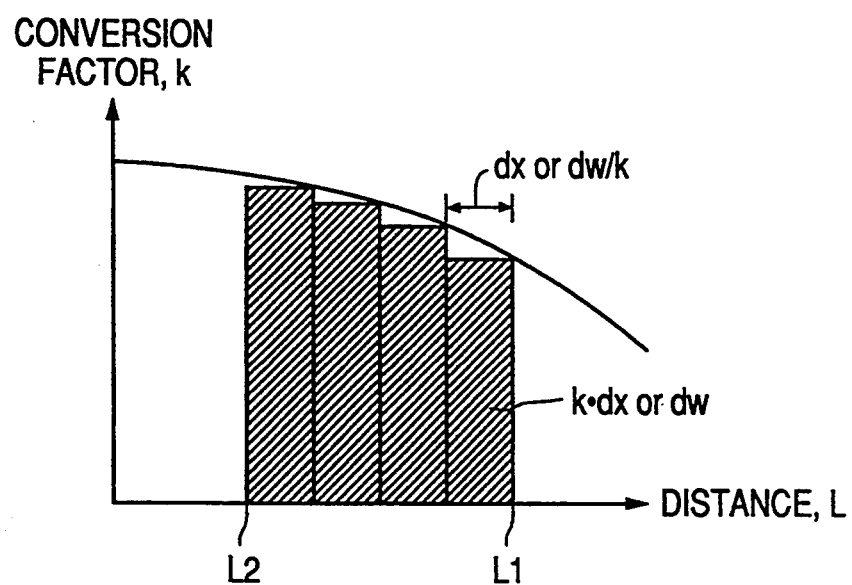
FIG. 4 is a graphic diagram illustrating drive control of the lens.

FIG. 4 is a graphic diagram illustrating the method of drive control of lens drive control unit 9. The ordinate represents the conversion factor k and the abscissa represents the distance L between the image plane and the optical element. The case is shown in which the defocus amount d has been detected when the distance was L1.

As mentioned above, the conversion factor k changes according to the distance L. However, there is a linear relationship between a small defocus dw and a small lens movement amount dx such that $dx=dw/k$ or $dw=k \cdot dx$. Therefore, for every small lens movement dx or small defocus dw from distance L1, a small interval of lens drive is performed by reading out the conversion factor k. The lens drive is stopped at the distance L2 when the accumulation of the small defocus dw or the accumulation of the small drive quantity $dx \cdot k$ has become equal to the detected defocus amount d, as described by equation (8):

$$d = \int_{L1}^{L2} dw \text{ or } d = \int_{L1}^{L2} k(L) \cdot dx \quad (8)$$

In FIG. 4, the area of the hatched portion becomes equivalent to the detected defocus amount d.

Lens drive control unit 9 finds the lens drive amount in a small interval, as mentioned above, and drives motor 10 built into body 1. The drive force of motor 10 is transmitted from a transmission unit 11 built into body 1 to a transmission unit 22 built into the lens 2 and the optical element is moved to focus photographic optical system 3. In addition, the drive amount of transmission unit 11 is monitored by encoder 12 and is fed back to lens drive control unit 9.

Conversion factor output unit 21 sends lens drive control unit 9 the ratio coefficient given by the mechanical ratio between the drive amount of transmission unit 11 and the movement amount of the optical element. Lens drive control unit 9 can control the movement amount of the optical element by means of the fed back drive amount and the ratio coefficient.

Accordingly, lens drive control unit 9 finds the lens drive amount corresponding to every small defocus amount and the movement of the optical element by the calculated lens drive amount is repeated. Finally, when the accumulated small defocus amounts have become equal to the detected defocus amount, motor 10 is stopped.

On the other hand, the lens drive control unit 9 could repeat the movement of the optical element in small drive amounts by drive amount ,control as previously discussed, wherein the small drive amounts are convened into defocus amounts and motor 10 is stopped when the accumulation of the converted small defocus amounts equals the detected defocus amount.

Figure 5:
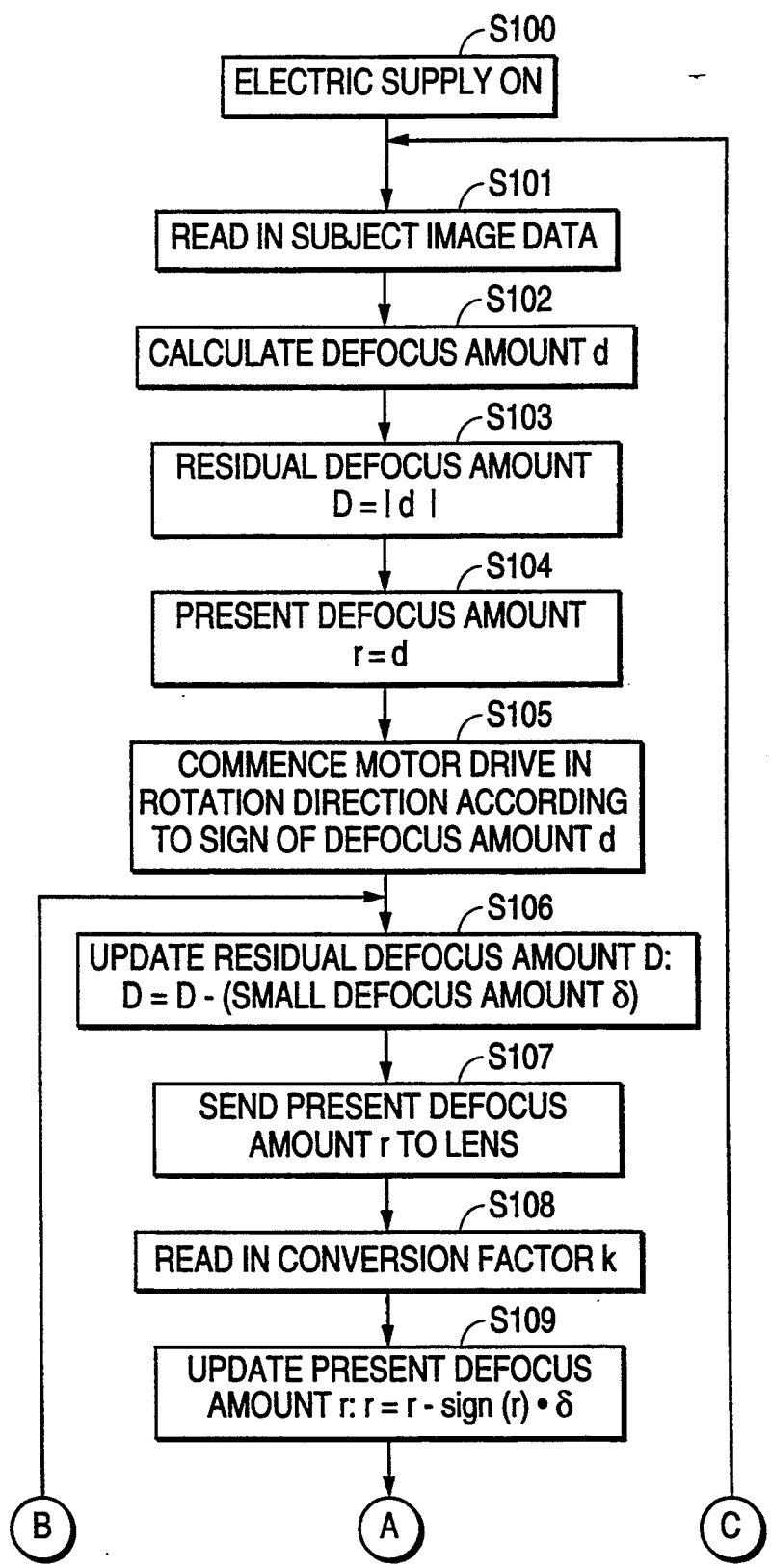
FIG. 5 is a flow chart showing the action of the defocus amount calculation unit and lens drive control unit.
Figure 6:
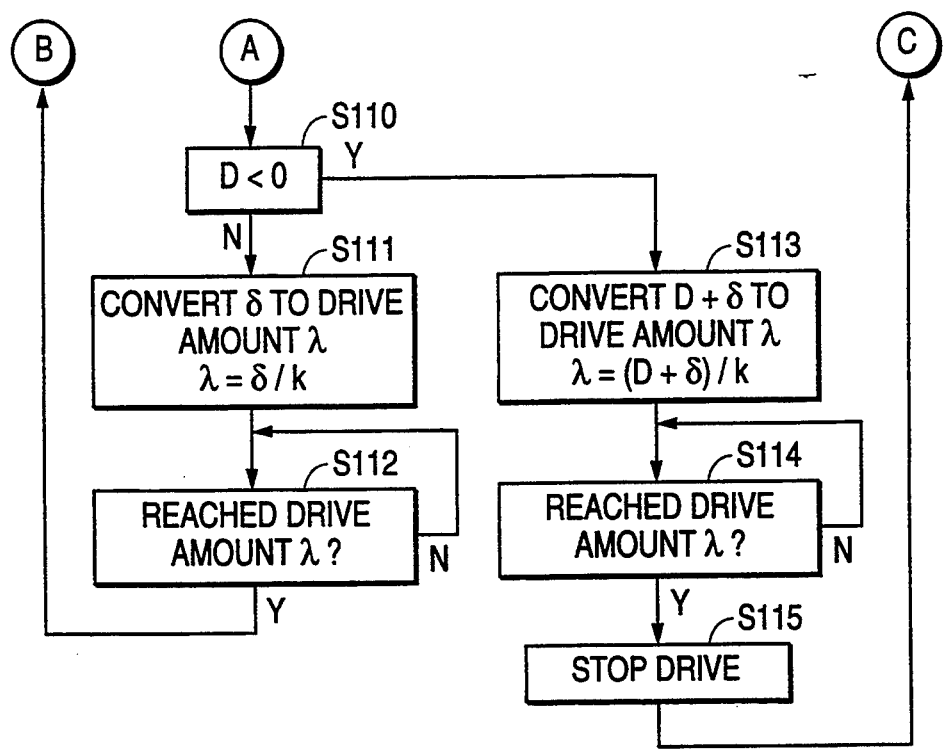
FIG. 6 is a continuation of the flow chart of FIG. 5.

FIGS. 5 and 6 are action flow charts for program processing by microcomputer BCPU 14 constituting defocus amount calculating unit 8 and lens drive control unit 9. In step S100, the electrical supply of the camera is switched On and, proceeding to step S101, the subject image data are read from sensor 7. In step S102, upon processing the subject image data, the defocus amount d is calculated. In the following step S103, the residual defocus amount D (residual amount of the defocus amount) is initialized at the absolute value of the defocus amount d. Further, in step S104, the actual defocus amount r (the defocus at the present point in time) is initialized at the defocus amount d. In step S105, the drive of motor 10 is commenced in the direction of rotation according to the sign of the defocus amount d (front pin, rear pin).

In step S106, a predetermined small defocus amount $\delta$ is subtracted from the residual defocus amount D, and the residual defocus amount D is updated. The predetermined small defocus amount $\delta$ is a value having no sign, and this small defocus amount $\delta$ as a unit is later repeated in a drive control loop. In step S107, the actual defocus amount r is sent to the conversion factor output unit on the lens 2 side. In step S108, the control factor k sent from conversion factor output unit 21 is read in, and in the following step S109, the actual defocus amount r is updated by subtracting from the actual defocus amount r the value of the product of the predetermined small defocus amount $\delta$ and the sign of the actual defocus amount r.

Next, proceeding to step S110 in FIG. 6, it is observed whether or not the residual defocus amount D is smaller than 0; if D is greater than 0 (wherein it is not the last step of drive control), the program proceeds to step S111; if D is smaller than 0 (wherein it is the last step of drive control), the program proceeds to step S 113. In step S111, from the conversion factor k at the present time, a small defocus amount $\delta$ is converted into the corresponding small drive amount $\lambda$ corresponding to $\lambda = \delta/k$. Furthermore, in step S112, the small drive amount $\lambda$ found is monitored based on the fed back drive amount from encoder 12 and the ratio coefficient and, on attaining the drive amount $\lambda$, the program returns to step S106 of FIG. 5 wherein the above-mentioned drive control steps are repeated.

On the other hand, in step S113, the small defocus amount $\delta$ is added to the residual defocus amount D, and the defocus amount at the last drive step is calculated, wherein the defocus quantity from the conversion factor k at the last step time point is converted into the corresponding small drive amount $\lambda$ as $\lambda = (D+\delta)/k$. In the following step S114, the small drive amount $\lambda$ is monitored, based on the fed back drive amount from the encoder 12 and the ratio coefficient. When the drive amount $\lambda$ is reached, proceeding to step S115, the motor 10 is stopped and the program returns to step 101 of FIG. 5 where the next cycle of the loop of finding the defocus amount is repeated.

Figure 7:
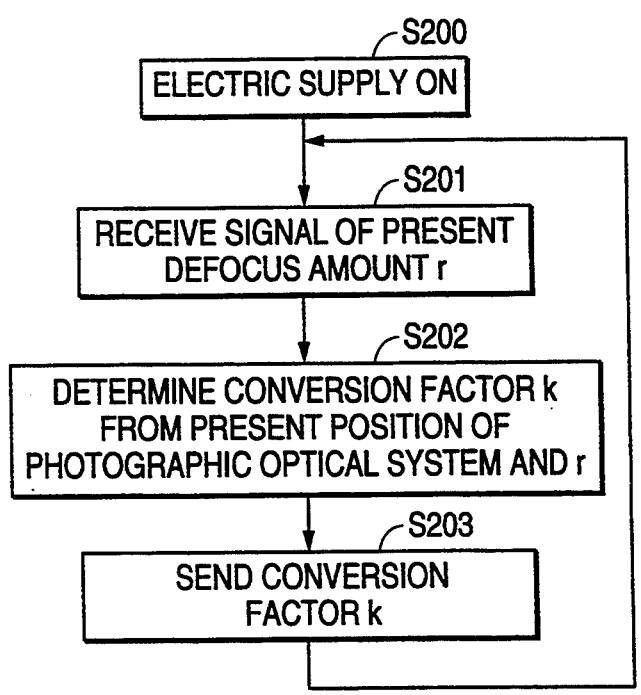
FIG. 7 is a flow chart showing the action of the conversion factor output unit.

FIG. 7 is a flow chart of the program processing by the microcomputer LCPU 16 constituting the lens side conversion factor output unit 21, corresponding to the operation of defocus amount calculation unit 8 and lens drive control unit 9 illustrated in FIGS. 5 and 6. In step S200, if the electric supply of the camera is switched ON, the system proceeds to step S201 and awaits the sending of the present defocus amount r from the body side lens drive control unit 9. After the actual defocus amount r has been sent, the program proceeds to S202 upon receiving this signal. In step S202, with the present time position z of the optical element of photographic lens system 3 and the actual defocus amount r at the present time as inputs, the conversion factor k at the present instant is calculated, or is determined from a conversion table. Then, in step S203, the determined conversion factor k is sent to the lens drive control unit 9 and the program returns to step S201 and waits until the present defocus amount r is sent from the body side lens drive control unit 9.

Figure 8:
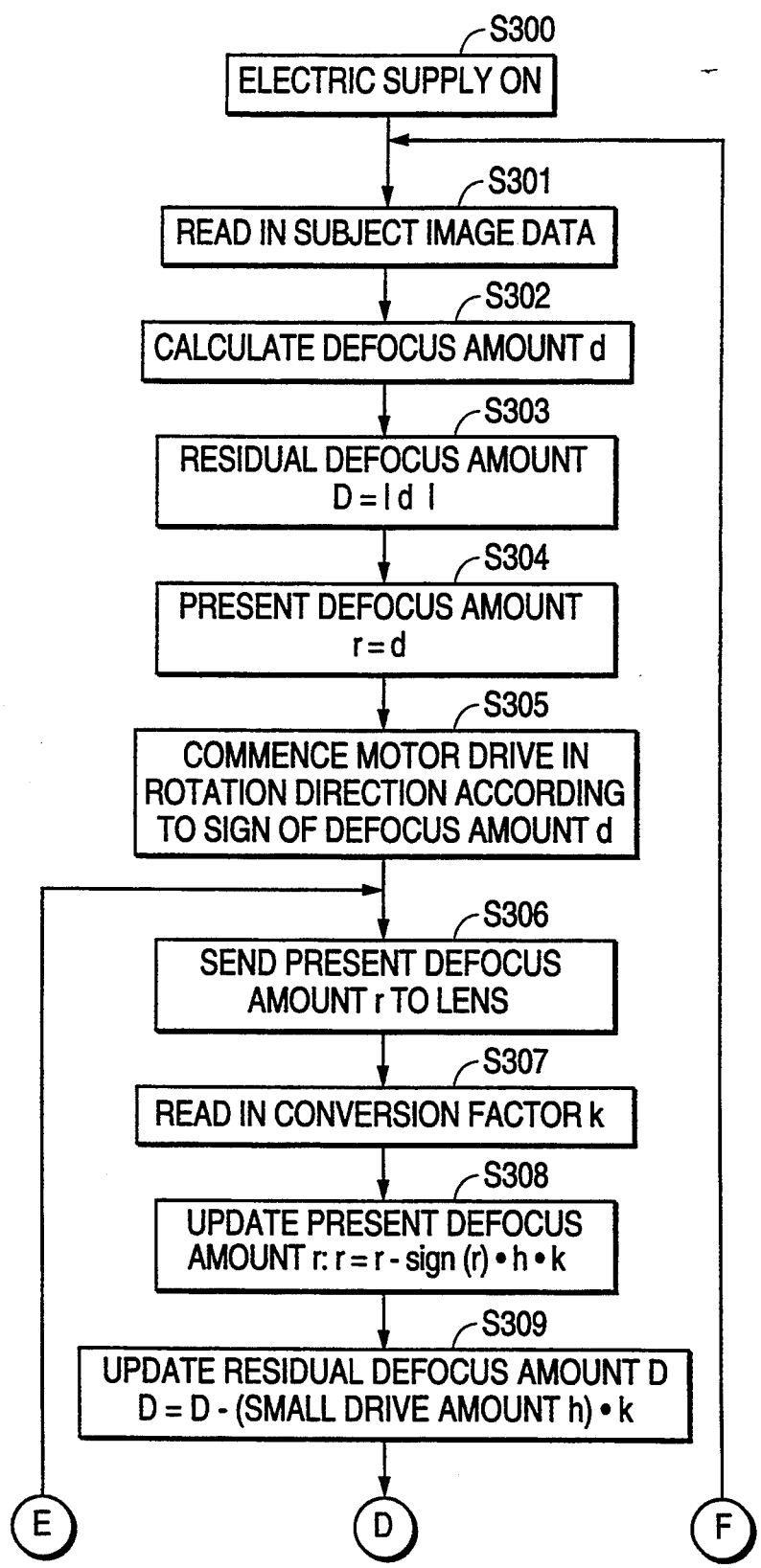
FIG. 8 is a flow chart showing the action of a modified example of the defocus amount calculation unit and lens drive control unit.
Figure 9:
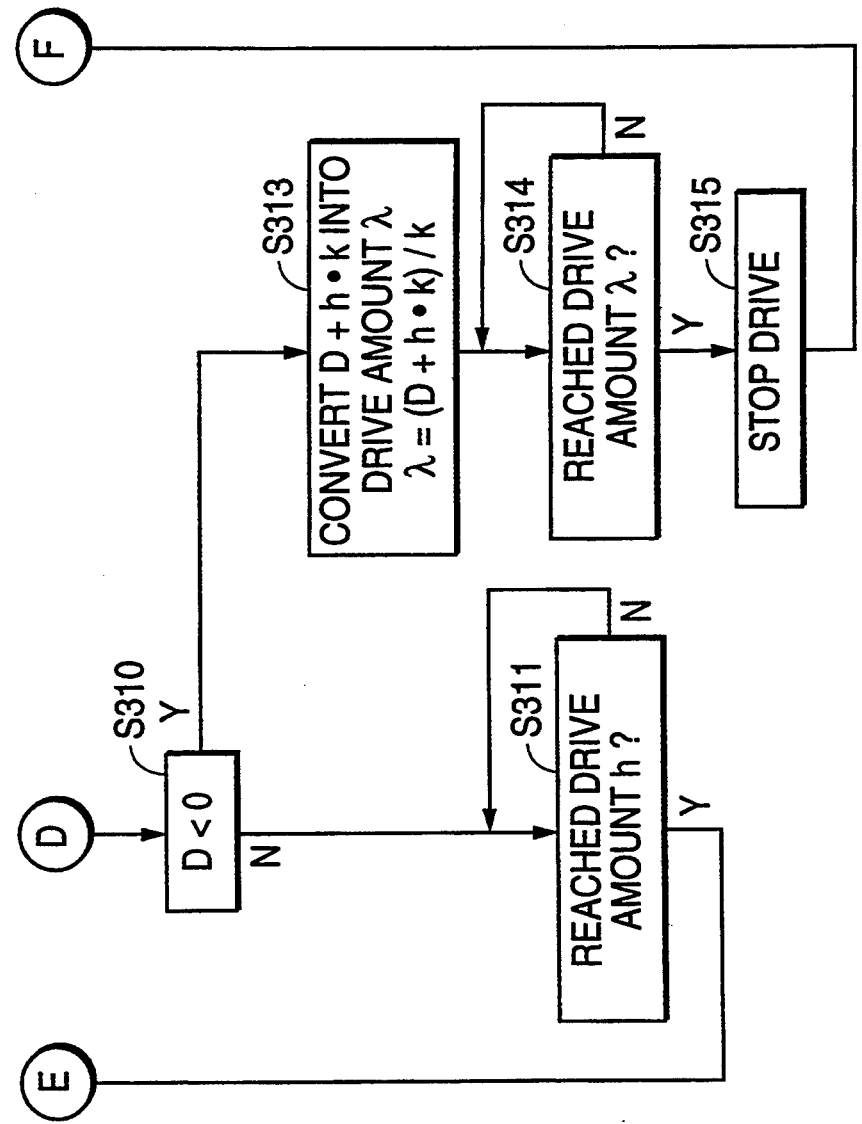
FIG. 9 is a continuation of the flow chart of FIG. 8.

FIGS. 8 and 9 are action flow charts for another program processing by the microcomputer BCPU 14 constituting defocus amount calculation unit 8 and lens drive control unit 9. In contrast to the example shown in FIGS. 5 and. 6 in which the lens drive control step is updated every defocus amount $\delta$, FIGS. 8 and 9 illustrate a modified example in which the step of lens drive control is updated every small drive amount h.

In step S300, the electrical supply of the camera is switched ON. Proceeding to step S301, the subject image data from sensor 7 are read in. In step S302, the subject image data are processed, and the defocus amount d is calculated. In the following step S303, the residual defocus amount D (residual amount of the defocus amount) is initialized at the absolute value of the defocus amount d. Furthermore, in step S304, the absolute defocus amount r (defocus at the present point in time) is initialized at the defocus amount d.

In step S305, the drive of motor 10 is commenced in the direction of rotation according to the sign of the defocus amount d (front pin, rear pin), and the program proceeds to step S306. In step S306, the present defocus amount: r is sent to lens side conversion factor output unit 21. In the following step S307, the conversion factor k sent from the conversion factor output unit 21 is read in. In step S308, a predetermined small drive amount h is converted with the present time value of the conversion factor k into the value h·k and then multiplied by the sign of the present defocus amount r to produce a value which is subtracted from the actual value of r, thereby updating the actual value of r. The predetermined small drive amount h is a value having no sign. With this small drive amount h as a unit, the following drive control loop is repeated.

In step S309, the residual defocus amount D is updated by subtracting the small defocus amount h·k from the residual defocus amount D. The program then proceeds to step S310 of FIG. 9. In step S310, it is observed whether or not the residual defocus amount D is smaller than 0; if D is greater than 0 (namely, in the case that it is not the last step of drive control), the program proceeds to step S311; if D is smaller than 0 (namely, in the case of the last step of drive control), the program proceeds to step S313. In step S311, the small drive amount h is monitored, based on the drive amount fed back from encoder 12 and the ratio coefficient, and on reaching the drive quantity h, the program returns to step S306 of FIG. 8 and the above-mentioned drive control steps are repeated.

On the other hand, in step S313, the small defocus amount h·k is added to the residual defocus amount D and the defocus amount of the final drive step is calculated, wherein the defocus amount is converted into the corresponding small drive amount $\lambda$ as $\lambda = (D+h\cdot k)/k$ using the last step present time conversion factor k. Furthermore, in step S314, the small drive amount $\lambda$ is monitored, based on the drive amount fed back from encoder 12 and on the ratio coefficient, and on reaching the drive amount $\lambda$ the program proceeds to step S315. In step S315, motor 10 is stopped, the program returns to step S301 of FIG. 8 and the loop of finding the next time defocus amount is repeated.

The operation of conversion factor output unit 21, while operating with the defocus amount calculation unit 8 and lens drive control unit 9 flow chart of FIGS. 5 and 6, was described in FIG. 7. When operating with the defocus amount calculation unit 8 and lens drive control unit 9 flow chart of FIGS. 8 and 9, the conversion factor output unit 21 also operates according to FIG. 7. Therefore, a discussion of FIG. 7 will not be repeated.

In the above-mentioned first embodiment, the conversion factor k was determined from the position z of the optical element and the defocus amount d or the actual defocus amount r, but in the case when the defocus is small, because $z > |d|$ or $z > |r|$, there is no great problem even if the conversion factor k is found only from the position z of the optical element. In this case, there is no necessity for drive control unit 9 to send the residual defocus amount r to conversion factor output unit 21.

Figure 10:
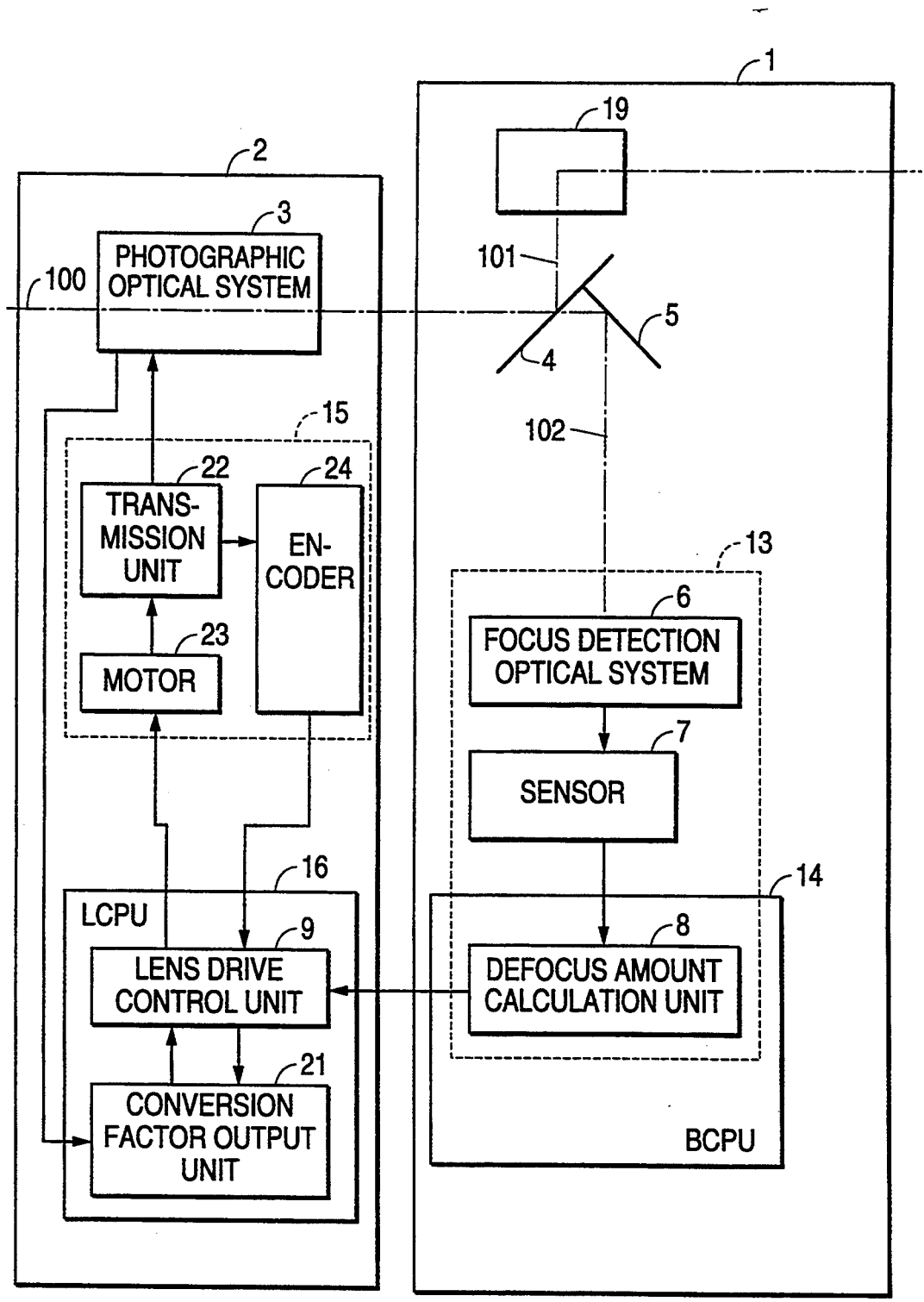
FIG. 10 is a block diagram illustrating a second embodiment of the invention.

FIG. 10 shows a second embodiment of an interchangeable lens camera system. In the first embodiment shown in FIG. 1, lens drive control unit 9 and drive unit 15 (i.e., at least motor 10, encoder 12, and transmission unit 11) are built into body 1. However, in this second embodiment, lens drive control unit 9 and drive unit 15 are built into lens 2. By building lens drive control unit 9 and drive unit 15 into lens 2, the operation of the system becomes simple because the information transmitted between the body and lens becomes only the defocus amount d. Therefore, the interface between the body and the lens becomes less complicated. In addition, the lens can change every time by a small defocus amount δ or a small drive amount h because the drive control method can be optimized according to the constitution of the lens side optical system or the drive characteristics. The flexibility of the system is therefore increased.

In FIG. 10, lens 2, which is shown facing body 1, is interchangeable. Photographic optical system 3 is a part of lens 2. A pencil 100 of light from a subject (not illustrated) passes through photographic optical system 3 and, by means of main mirror 4 and half-silvered sub-mirror 5, is divided in the direction of sub-mirror 5 and viewfinder 19 into portions 101 and 102 of the light pencil. The light pencil portion 102 deflected downwards by sub-mirror 5 towards the bottom of body 1 passes to focus detection optical system 6 located adjacent to the predetermined focal plane of photographic optical system 3. A subject image formed by focus detection optical system 6 is photoelectrically converted by sensor 7, thereby becoming electrical subject image signals. These electrical subject image signals are introduced into BCPU microcomputer 14 and defocus amount calculation unit 8. Defocus amount calculation unit 8, by finding the mutual position relationship of the subject image signals, detects the defocus amount d of the image plane of photographic optical system 3 and the predetermined focal plane. Moreover, focus detection optical system 6, sensor 7, and defocus amount calculation unit 8 constitute focus detection unit 13.

Defocus amount calculation unit 8 sends the calculated amount d to the lens drive control unit 9 included in the microcomputer LCPU 16. Lens drive control unit 9 sends the defocus amount d or the actual defocus amount r to conversion factor output unit 21 constituted by the microcomputer LCPU 16 built on the lens 2 side. Moreover, photographic lens system 3 includes an optical element (not illustrated) which is movable for focus adjustment. Conversion factor output unit 21 finds the conversion factor k based on the lens position z of the optical element and the defocus amount d, and then sends the conversion factor to lens drive control unit 9.

Moreover, motor 23, transmission unit 22 and encoder 24 constitute drive unit 15.

The process of determining the conversion factor k from the lens position z and the defocus amount d is the same as for the embodiment of FIG. 1, and a description is therefore omitted.

Lens drive control unit 9 receives the conversion factor k from the conversion factor output unit 21, and in a process similar to that for the system of FIG. 1, finds a lens drive amount for each small interval and drives motor 23 built into lens 2. The drive force of motor 23 is transmitted by transmission unit 22 built into lens 2. Finally, the optical element is moved to adjust the focus of photographic lens system 3. In addition, the drive amount of transmission unit 22 is monitored by encoder 24 built into lens 2 and is fed back to lens drive control unit 9. Conversion factor output unit 21 sends to the lens drive control unit 9 a ratio coefficient given by the mechanical ratio relationship between the drive amount of transmission unit 22 and the amount of movement of the optical element. Lens drive control unit 9 can control the amount of movement of the optical element by means of the fed back drive amount and the ratio coefficient. Accordingly, lens drive control unit 9 finds a lens drive amount corresponding to every small defocus amount and, as previously discussed, moves the optical element by this lens drive amount. This process is repeated. Finally, when the accumulated small defocus amounts become equal to the detected defocus amount, motor 23 is stopped.

On the other hand, while lens drive control unit 9 is repeating the movement of the optical element by small drive amounts, lens drive control unit 9 could convert the small drive amounts into defocus amounts and stop motor 23 when the accumulation of the converted small defocus amounts equals the detected defocus amount.

Figure 11:
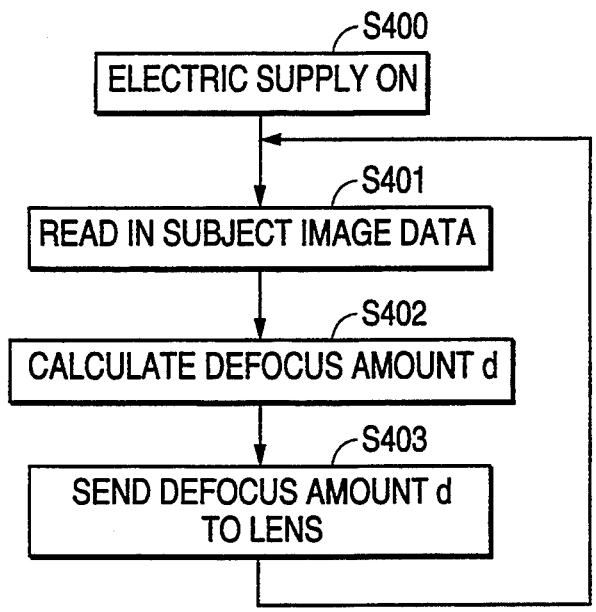
FIG. 11 is a flow chart showing the action of the defocus amount calculation unit.
Figure 13:
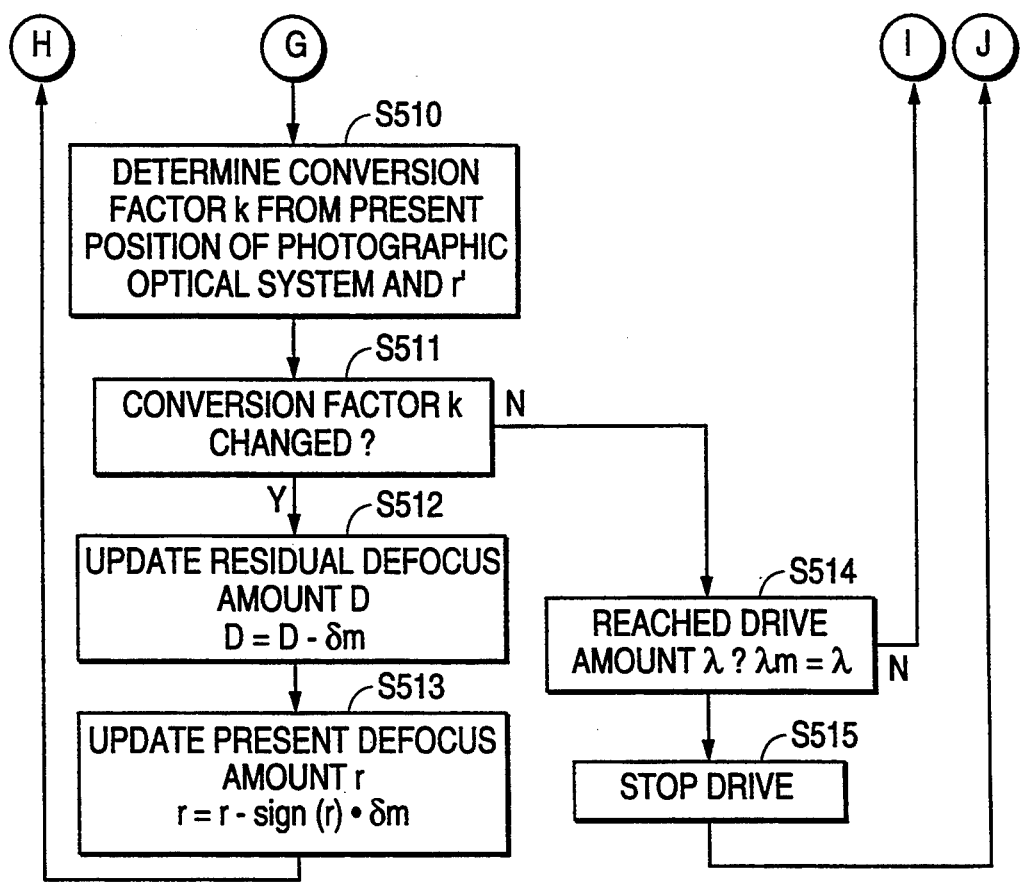
FIG. 13 is a flow chart showing the action of the lens drive control unit and the conversion factor output unit.

In the second embodiment illustrated in FIG. 10, the step of lens drive is updated for every change in the conversion factor k. FIG. 11 is an action flow chart showing program processing by microcomputer BCPU 14 constituting defocus amount calculation unit 8. FIGS. 12 and 13 are action flow charts showing the program processing by the microcomputer LCPU 16 constituting lens drive control unit 9 and conversion factor output unit 21. By comparison, in the previously discussed first embodiment of FIG. 1, the step of lens drive control (as shown in FIGS. 5 and 6) is updated for every small defocus amount δ. Moreover, in a modified example of the above-mentioned first embodiment of FIG. 1, the step of lens drive control (as shown in FIGS. 8 and 9) is updated for every small drive amount h.

The program processing by the BCPU 14 of FIGS. 10 will be described using FIG. 11. When the electrical supply of the camera is switched ON in step S400, proceeding to step S401, the subject image data is read in from sensor 7. In the following step S402, the subject image data is processed and the defocus amount d is found. Furthermore, in step S403, the detected defocus amount d is sent to lens drive control unit 9. Thereafter, on returning to step S401, the loop of finding the defocus amount is repeated.

The program processing by LCPU 16 will be described using FIGS. 12 and 13. When the electrical supply of the camera is switched ON in step S500, proceeding to step S501, the system awaits the sending of the defocus amount d from the body side lens drive control unit 9. When the defocus amount d is sent, upon receiving this, the program proceeds to step S502. In step S502, the residual defocus amount D (the remaining amount of the defocus amount) is initialized to the absolute value of the defocus amount d. In the following step S503, the present defocus amount r (the defocus amount at the present point in time) is initialized to the defocus amount d. In step S504, with the present position z of the optical element of photographic lens system 3 and the present defocus amount r at the present point in time as inputs, the present time conversion factor is calculated or is found from a conversion table. Furthermore, in step S505, the drive of motor 23 is commenced in a direction of rotation according to the sign of the defocus amount d (front pin, rear pin).

In step S506, the residual defocus amount D is converted, using the present time conversion factor k, into a drive amount $\lambda$ as $\lambda = D/k$. Proceeding to step S507, the movement amount of the optical element is found from the drive amount fed back from encoder 24 and the ratio coefficient and the drive monitor amount $\lambda m$ is set to $\lambda m = 0$. In step S508, the drive monitor amount $\lambda m$, changing moment by moment, is converted into a corresponding defocus amount $\lambda m$, as $\lambda m = k \cdot \lambda m$. Furthermore, in step S509, a momentary defocus amount r' is formed by subtracting from the present defocus amount r the product of the small defocus amount $\delta m$ with the sign of the present defocus amount r.

Next, in step S510 of FIG. 13, with the present position z of the optical element and the present momentary defocus amount r' as inputs, the present time conversion factor k is calculated, or is found from a conversion table. In step S511, it is observed whether or not the conversion factor k found in step S510 has changed from the previously obtained conversion factor k; if it has changed (namely, the drive control has to be updated), the program proceeds to step S512, and if it has not changed (namely, there is no need to update the drive control), the program proceeds to step S514. Whether the conversion factor has changed is determined as follows: in the case where the conversion factor is found by calculation, the ratio to the previous conversion factor is tested as to whether or not it is within $1 \pm c$ (c being a predetermined value); in the case where the conversion factor is found from a table, it is observed whether or not it is equal to the previous value.

In step S512, the small defocus amount $\delta m$ corresponding to the present time drive monitor amount $\lambda m$ is subtracted from the residual defocus amount D, thereby updating the residual defocus amount D. In the following step S513, the present defocus amount r is updated by subtracting from the present defocus amount r the product of the small defocus amount $\delta m$ with the sign of the present defocus amount r. After this, the program returns to the step S506 and the drive control moves is relation to the new conversion factor.

On the other hand, in step S514, it is observed whether the drive monitor amount $\lambda m$ found in step S506 has reached the drive amount $\lambda$. In the case where this has been reached, the program proceeds to step S515, and if not, the program returns to step S508 of FIG. 12 and the existing drive control continues until the conversion factor k changes. In step S515, motor 23 is stopped and, returning to step S501, the sending of a defocus amount d from the body side is awaited.

Moreover, in the flow charts shown in FIGS. 12 and 13, the system is ready to receive the next defocus amount when the defocus amount d is sent from the body side and the lens drive amount is reached in correspondence to receipt of the defocus amount from the body side. In the event of an interruption in receiving the defocus amount, the processing of step S501 will be suspended and may be commenced when the defocus amount is received.

In the above-mentioned second embodiment shown in FIG. 10, the drive control is updated only in the case that the conversion factor changes. Therefore, the number of times the drive control is updating the lens is reduced if the conversion factor rarely changes. In addition, the demands on the responsiveness of the lens control are not as great as in the first embodiment. As a result, the use of a high performance lens side LCPU 16 is not necessary.

By means of the present invention as described herein, a small lens drive amount is found for each small defocus amount using a conversion factor related to the optical element of the photographic optical system and drive control of the optical element is thereby performed. Therefore, regardless of the focus adjustment system of the photographic optical system, the lens drive amount corresponding to the detected defocus amount can be correctly found and the responsiveness and control accuracy of the focus adjustment action can be increased.

Furthermore, results similar to the above-mentioned are obtained by using a conversion factor related to the position of the optical element and finding a small defocus amount for each small drive amount, such that the drive of the optical element of the photographic optical system is stopped when the accumulated value of these small defocus amounts becomes equal to the detected defocus amount.

In the above embodiments, drive unit 15 respectively constitutes a driving means; the focus detection unit 13 constitutes a focus detection means; conversion factor output unit 21 constitutes a conversion factor output means; lens drive control unit 9 constitutes a drive control means; and defocus amount calculation unit 8 constitutes a residual defocus calculation means.

It is understood that the above-described embodiments are merely illustrative of the possible specific embodiments which represent and employ principles of the present invention. Other arrangements may readily be devised in accordance with these principles by those skilled in the art without departing from the scope of the invention, the scope of which is defined in the claims and their equivalents.

What is claimed is:

1. An autofocus adjustment apparatus comprising:
    a photographic optical system having an optical element movable in the optical axis direction in order to form a subject image on a predetermined focal plane, the optical element initially being at a first position at which the photographic optical system is not in focus;
    driving means for driving said optical element from the first position in the optical axis direction;
    focus detection means for detecting a first defocus amount of an image plane of said photographic optical system with respect to said predetermined focal plane, the first defocus amount corresponding to the first position of the optical element and being divisible by a smaller, second defocus amount;
    conversion factor output means for outputting conversion factors for use in converting the second defocus amount into a drive amount according to the position of said optical element in the optical axis direction; and a drive control means for calculating respective drive amounts according to the second defocus amount and a conversion factor at the present position of said optical element repeatedly, for operating said driving means by said drive amount repeatedly and for stopping said driving means when an accumulated value of the second defocus amount approximately equals the first defocus amount.

2. An autofocus adjustment apparatus as in claim 1, further comprising a residual defocus amount calculation means for calculating a residual defocus amount, wherein said conversion factor output means utilizes the residual defocus amount and the position of said optical element for determining the conversion factor.

3. An autofocus adjustment apparatus as in claim 1, wherein said photographic optical system and said conversion factor output means are located in an interchangeable lens device which is detachable from a camera body and said focus detection means is located in said camera body.

4. An autofocus adjustment apparatus as in claim 1, wherein said photographic optical system, said driving means, said conversion factor output means and said drive control means are located in an interchangeable lens device which is detachable from a camera body.

5. An autofocus adjustment apparatus comprising:
a photographic optical system having an optical element movable in the optical axis direction in order to form a subject image on a predetermined focal plane, the optical element initially being at a first position at which the photographic optical system is not in focus;
driving means for driving said optical element from the first position in the optical axis direction;
focus detection means for detecting a first defocus amount of an image plane of said photographic optical system with respect to said predetermined focal plane, the first defocus amount corresponding to the first position of the optical element;
conversion factor output means for outputting conversion factors for use in converting a respective defocus amount into a drive amount according to the position of said optical element in the optical axis direction; and
drive control means for operating said driving means by a drive amount repeatedly, for calculating a respective second defocus amount according to said drive amount and a conversion factor at the present position of said optical element repeatedly and for stopping said driving means when an accumulated value of said respective second defocus amounts approximately equals the first defocus amount.

6. An autofocus adjustment apparatus as in claim 5, further comprising a residual defocus amount calculation means for calculating a residual defocus amount wherein said conversion factor output means utilizes the residual defocus amount and the position of said optical element for determining the conversion factor.

7. An autofocus adjustment apparatus as in claim 6, wherein said photographic optical system and said conversion factor output means are located in an interchangeable lens device which is detachable from a camera body and said focus detection means is built into said camera body.

8. An autofocus adjustment apparatus as in claim 6, wherein said photographic optical system, said driving means, said conversion factor output means and said drive control means are located in an interchangeable lens device which is detachable from a camera body.

9. An autofocus adjustment apparatus comprising:
a photographic optical system having an optical element movable in the optical axis direction in order to form a subject image on a predetermined focal plane, the optical element initially being at a first position at which the photographic optical system is not in focus;
driving means for driving said optical element from the first position in the optical axis direction;
focus detection means for detecting a first defocus amount of an image plane of said photographic optical system with respect to said predetermined focal plane, the first defocus amount corresponding to the first position of the optical element;
conversion factor output means for outputting conversion factors for use in converting a respective defocus amount into a drive amount according to the position of said optical element in the optical axis direction; and
drive control means for calculating a drive amount according to the first defocus amount and a conversion factor at the position of said optical element when the first defocus amount is detected, for operating said driving means by said drive amount, for recalculating the drive amount according to a residual defocus amount and a conversion factor at the present position of said optical element when the value of the conversion factor changes, for reoperating said driving means by said recalculated drive amount and for stopping said driving means when the residual defocus amount is approximately zero.

10. An autofocus adjustment apparatus as in claim 9, further comprising a residual defocus amount calculation means for calculating a residual defocus amount wherein said conversion factor output means utilizes the residual defocus amount and the position of said optical element for outputting said conversion factor.

11. An autofocus adjustment apparatus as in claim 9, wherein said photographic optical system and said conversion factor output means are located in an interchangeable lens device which is detachable from a camera body and said focus detection means is built into said camera body.

12. An autofocus adjustment apparatus as in claim 9, wherein said photographic optical system, said driving means, said conversion factor output means and said drive control means are located in an interchangeable lens device which is detachable from a camera body.

13. An interchangeable lens device, including a photographic optical system having an optical element moveable in the optical axis direction in order to form a subject image on a predetermined focal plane, the optical element initially being at a first position at which the photographic optical system is not in focus, the photographic optical system being removable from a camera body which includes a focus detection unit which detects a first defocus amount of an image plane of the photographic optical system with respect to the predetermined focal plane, the first defocus amount corresponding to the first position of the optical element, the device comprising:

a driving unit which drives the optical element from the first position in the optical axis direction;

a receiving unit which receives the first defocus amount from the camera body;

a conversion factor output unit which outputs conversion factors for use in converting a respective defocus amount into a drive amount according to the position of said optical element in the optical axis direction; and a drive control unit which operates said driving unit by a drive amount repeatedly, calculates a respective second defocus amount according to the drive amount and a conversion factor at the present position of said optical element repeatedly, and stops said driving unit when an accumulated value of said respective second defocus amounts approximately equals the first defocus amount.

14. An interchangeable lens device including a photographic optical system having an optical element movable in the optical axis direction in order to form a subject image on a predetermined focal plane, the optical element initially being at a first position at which the photographic optical system is not in focus and the photographic optical system being removable from a camera body which includes focus detection means for detecting a first defocus amount of an image plane of said photographic optical system with respect to said predetermined focal plane, the first defocus amount corresponding to the first position of the optical element and being divisible by a smaller, second defocus amount, the device comprising:

driving means for driving an optical element from the first position in the optical axis direction;

receiving means for receiving the first defocus amount from the camera body;

conversion factor output means for outputting conversion factors for use in converting the second defocus amount into a drive amount according to the position of said optical element in the optical axis direction; and drive control means for calculating respective drive amounts according to the second defocus amount and a conversion factor at the present position of said optical element repeatedly, for operating said driving means by said drive amount repeatedly, and for stopping said driving means when an accumulated value of said second defocus amount approximately equals the first defocus amount.

15. An interchangeable lens device, including a photographic optical system having an optical element moveable in the optical axis direction in order to form a subject image on a predetermined focal plane, the optical element initially being at a first position at which the photographic optical system is not in focus, the photographic optical system being removable from a camera body which includes focus detection means for detecting a first defocus amount of an image plane of the photographic optical system with respect to the predetermined focal plane, the first defocus amount corresponding to the first position of the optical element, the device comprising:

driving means for driving the optical element from the first position in the optical axis direction;

receiving means for receiving the first defocus amount from the camera body;

conversion factor output means for outputting conversion factors for use in converting a respective defocus amount into a drive amount according to the position of said optical element in the optical axis direction; and drive control means for operating said driving means by a drive amount repeatedly, for calculating a respective second defocus amount according to the drive amount and a conversion factor at the present position of said optical element repeatedly, and for stopping said driving means when an accumulated value of said respective second defocus amounts approximately equals the first defocus amount.

16. An interchangeable lens device including a photographic optical system having an optical element movable in the optical axis direction in order to form a subject image on a predetermined focal plane, the optical element initially being at a first position at which the photographic optical system is not in focus and the photographic optical system being removable from a camera body which includes focus detection means for detecting a first defocus amount of an image plane of the photographic optical system with respect to the predetermined focal plane, the first defocus amount corresponding to the first position of the optical element, the device comprising:

driving means for driving the optical element from the first position in the optical axis direction;

receiving means for receiving the first defocus amount from the camera body;

conversion factor output means for outputting conversion factors for use in converting a respective defocus amount into a drive amount according to the position of the optical element in the optical axis direction; and drive control means for calculating a drive amount according to the first defocus amount and a conversion factor at the position of the optical element when the first defocus amount is detected, for operating said driving means by said drive amount, for recalculating the drive amount according to a residual defocus amount and a conversion factor at the present position of said optical element when the value of the conversion factor changes, for reoperating said driving means by the recalculated drive amount and for stopping said driving means when the residual defocus amount is approximately zero.

17. An autofocus adjustment apparatus comprising:

a photographic optical system having an optical element movable in the optical axis direction in order to form a subject image on a predetermined focal plane, the optical element initially being at a first position at which the photographic optical system is not in focus;

a driving unit which drives said optical element from the first position in the optical axis direction,;

a focus detection unit which detects a first defocus amount of an image plane of said photographic optical system with respect to said predetermined focal plane, the first defocus amount corresponding to the first position of the optical element and being divisible by a smaller, second defocus amount;

a conversion factor output unit which outputs conversion factors for use in converting the second defocus amount into a drive amount according to the position of said optical element in the optical axis direction; and a drive control unit which calculates respective drive amounts according to the second defocus amount and a conversion factor at the present position of said optical element repeatedly, operates said driving unit by said drive amount repeatedly and stops said driving unit when an accumulated value of the second defocus amount approximately equals the first defocus amount.

18. An autofocus adjustment apparatus comprising:
a photographic optical system having an optical element movable in the optical axis direction in order to form a subject image on a predetermined focal plane, the optical element initially being at a first position at which the photographic optical system is not in focus;
a driving unit which drives said optical element from the first position in the optical axis direction;
a focus detection unit which detects a first defocus amount of an image plane of said photographic optical system with respect to said predetermined focal plane, the first defocus amount corresponding to the first position of the optical element;
a conversion factor output unit which outputs conversion factors for use in converting a respective defocus amount into a drive amount according to the position of said optical element in the optical axis direction; and
a drive control unit which operates said driving unit by a drive amount repeatedly, calculates a respective second defocus amount according to said drive amount and a conversion factor at the present position of said optical element repeatedly and stops said driving unit when an accumulated value of said respective second defocus amounts approximately equals the first defocus amount.

19. An interchangeable lens device including a photographic optical system having an optical element movable in the optical axis direction in order to form a subject image on a predetermined focal plane, the optical element initially being at a first position at which the photographic optical system is not in focus and the photographic optical system being removable from a camera body which includes a focus detection unit which detects a first defocus amount of an image plane of said photographic optical system with respect to said predetermined focal plane, the first defocus amount corresponding to the first position of the optical element and being divisible by a smaller, second defocus amount, the device comprising:
a driving unit which drives an optical element from the first position in the optical axis direction;
a receiving unit which receives the first defocus amount from the camera body;
a conversion factor output unit which outputs conversion factors for use in converting the second defocus amount into a drive amount according to the position of said optical element in the optical axis direction; and
a drive control unit which calculates respective drive amounts according to the second defocus amount and a conversion factor at the present position of said optical element repeatedly, operates said driving unit by said drive amount repeatedly, and stops said driving unit when an accumulated value of said second defocus amount approximately equals the first defocus amount.

* * * * *

UNITED STATES PATENT AND TRADEMARK OFFICE
CERTIFICATE OF CORRECTION

PATENT NO. : 5,430,287
DATED : July 4, 1995
INVENTOR(S) : Yosuke KUSAKA

It is certified that error appears in the above-indentified patent and that said Letters Patent is hereby corrected as shown below:

Title Page, Column 2, line 1 "FOREIGN PATENT DOCUMENTS"

"7/2887" should be --7/1987--

Signed and Sealed this

Twenty-sixth Day of December, 1995

Attest:

BRUCE LEHMAN

*Attesting Officer*     *Commissioner of Patents and Trademarks*